United States Patent [19]

Kelsey

[11] Patent Number: 4,987,994
[45] Date of Patent: Jan. 29, 1991

[54] SPUR CONVEYOR ASSEMBLY

[75] Inventor: Richard W. Kelsey, West Chester, Ohio

[73] Assignee: Pre-Engineered Components, Inc., Cincinnati, Ohio

[21] Appl. No.: 364,145

[22] Filed: Jun. 12, 1989

[51] Int. Cl.$^5$ ............................................. B65G 15/60
[52] U.S. Cl. .................................... 198/811; 198/839
[58] Field of Search ................................ 198/839, 811

[56] References Cited

U.S. PATENT DOCUMENTS

| | | |
|---|---|---|
| 2,798,590 | 7/1957 | Raskin . |
| 3,016,127 | 1/1962 | Cooper . |
| 3,189,166 | 6/1965 | Ziller . |
| 3,203,536 | 8/1965 | Shaw . |
| 3,253,698 | 5/1966 | Murphy ......................... 198/839 X |
| 4,206,994 | 6/1980 | Silverberg et al. . |
| 4,655,340 | 4/1987 | Steel . |

FOREIGN PATENT DOCUMENTS

| | | | |
|---|---|---|---|
| 433756 | 8/1935 | United Kingdom | ................. 198/839 |
| 2189758 | 11/1987 | United Kingdom | ................. 198/839 |

Primary Examiner—H. Grant Skaggs
Assistant Examiner—D. Glenn Dayoan
Attorney, Agent, or Firm—Jacox & Meckstroth

[57] ABSTRACT

An endless flexible belt extends around a set of end rollers supported by a frame with the axes of the rollers defining an angle of 90 degrees therebetween, and one of the end rollers is driven by a variable speed electric motor and gear reducer unit. A pair of vertically spaced and non-rotating parallel belt guide tubes have end portions rigidly supported by the frame and extend within the belt at a transverse angle of 45 degrees for changing the direction of the belt travel by 90 degrees. The belt wraps around the tubes and extends between the tubes to the driven roller. Pressurized air is supplied to the tubes, and the air flows outwardly through spaced holes within a high pressure zone on each tube to produce a film of air between the tube and the belt portion extending around the tube. The air films permit circumferential and axial movement of the belt on each tube with minimum friction so that the belt may be driven at a high speed with minimum belt wear.

12 Claims, 2 Drawing Sheets

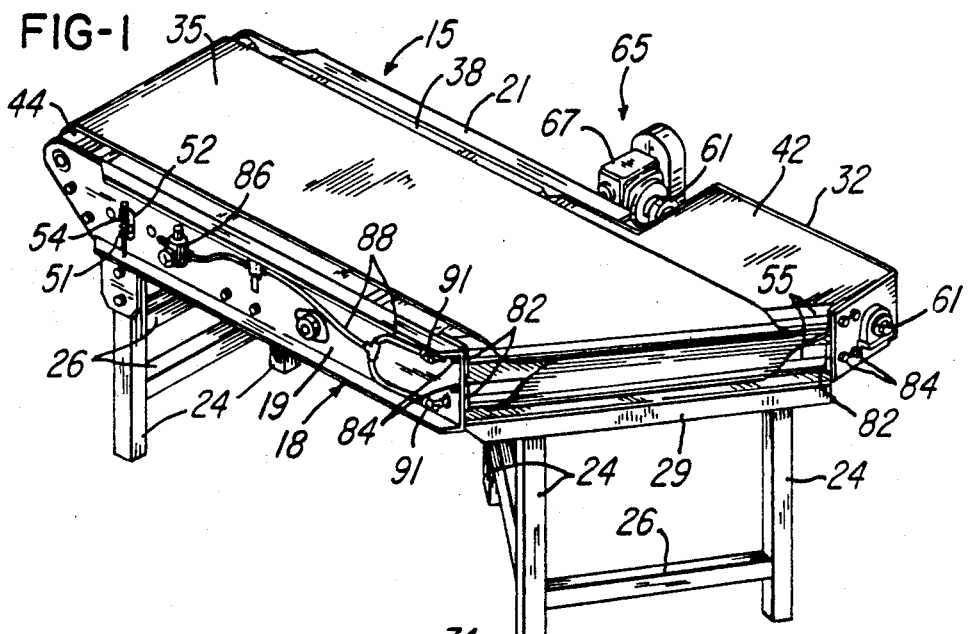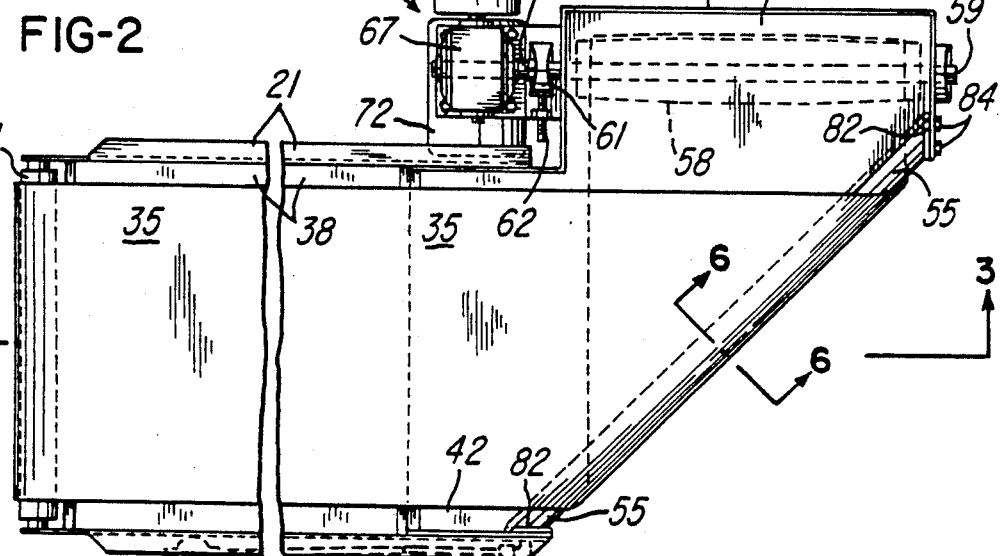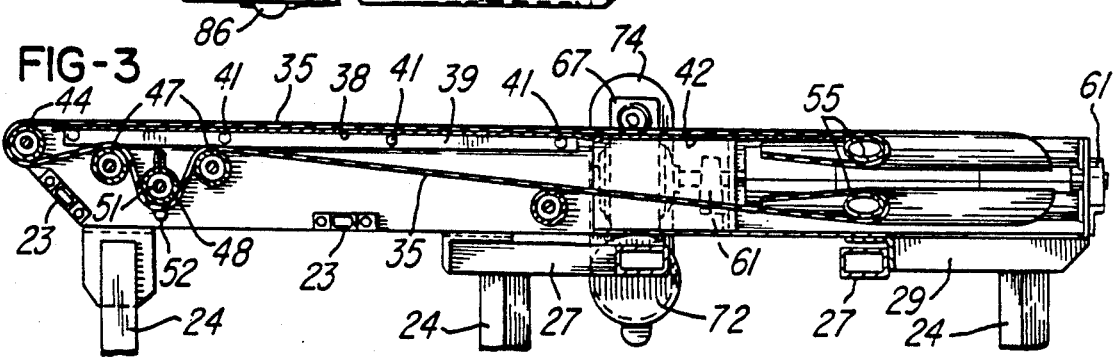

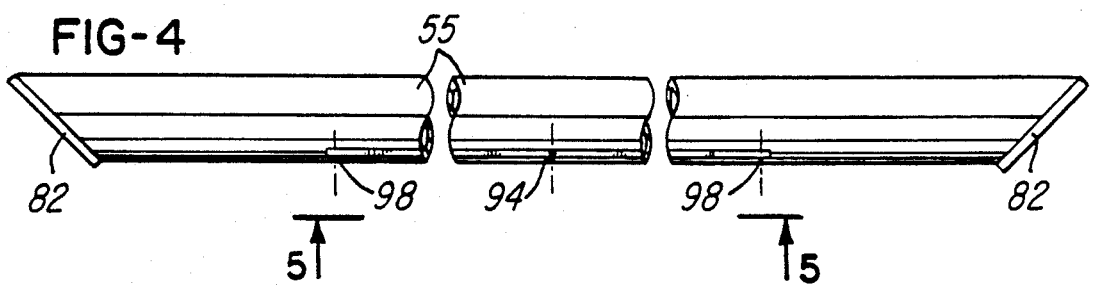
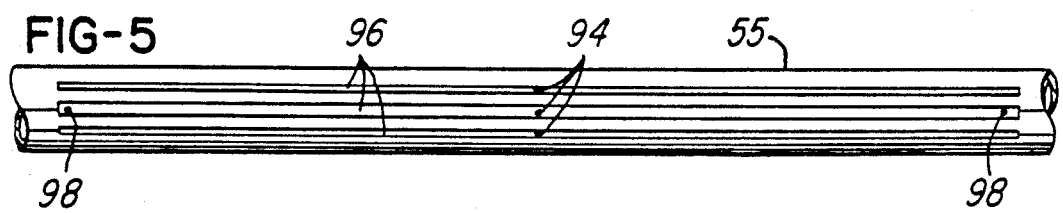
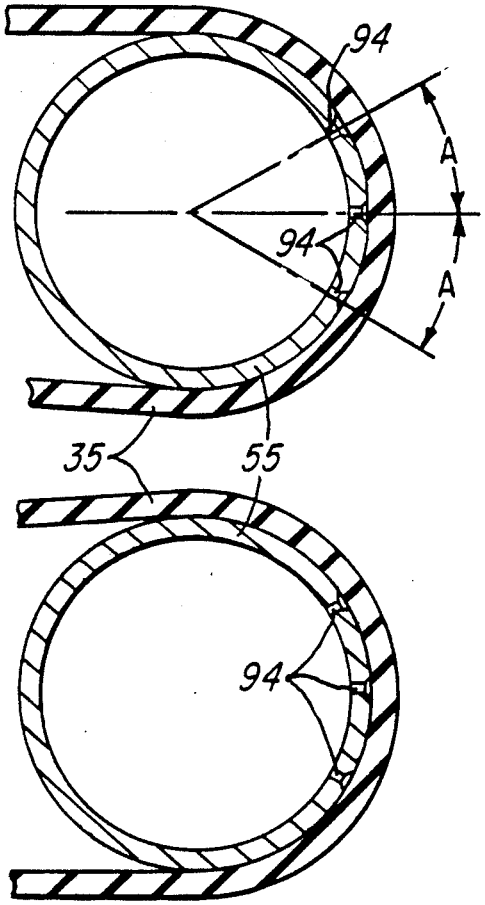

SPUR CONVEYOR ASSEMBLY

BACKGROUND OF THE INVENTION

In the art of endless belt conveyors for transporting packages and other articles, it is known to use a stationary rod or roller positioned at a transverse angle with respect to the path of the belt for changing the direction of the belt path by a predetermined angle, for example, as disclosed in U.S. Pat. Nos. 2,798,590 and 3,189,166. When the belt travels around such a transverse rod or roller, it is necessary for the belt to slip or slide axially on the rod or roller. This axial sliding movement of the belt does not produce a significant friction heat problem if the belt is traveling at a relatively low speed, for example, under 50 feet per minute. However, as the speed of the belt increases, the sliding and friction heat causes the belt to wear in proportion to the speed of the belt, and the useful life of the belt is significantly reduced.

The friction heat and belt wear may be reduced in higher speed transport conveyors by incorporating either rollers or stationary tubes with a number of peripherally spaced and axially spaced small wheels or bearings, for example, as disclosed in U.S. Pat. Nos. 3,016,127 and 4,655,340. It has also been proposed to reduce friction heat and belt wear by mounting a row of small inclined rollers or bearings on a stationary rod, for example, as disclosed in U.S. Pat. No. 3,203,536. However, it has been determined that the rollers or tubes with peripherally spaced small bearings or a row of inclined bearings add significantly to the cost of the belt conveyor system and still result in significant belt wear when the belt is driven at a faster speed of several hundred feet per minute. The independent wheels or bearings produce undesirable stress concentrations in the endless belt, contributing to belt wear.

SUMMARY OF THE INVENTION

The present invention is directed to an improved endless belt conveyor system which is ideally suited for use as a spur conveyor for a main conveyor to supply or merge packages or articles onto the main conveyor or to separate or diverge the packages or articles from the main conveyor, depending upon the use of the main conveyor. The conveyor system of the invention is especially suited for high speed operation, for example, having a belt speed from 250 to 500 feet per minute, and substantially eliminates friction heat and the associated belt wear. An endless belt spur conveyor constructed in accordance with the invention is also adapted to transport relatively heavy packages or articles and can be easily and quickly installed in close proximity to a main conveyor wherever it is desired to merge the articles onto the main conveyor or remove the articles from the main conveyor. The conveyor assembly of the invention is also simple and relatively inexpensive in construction, and the endless belt may be driven in either direction.

In accordance with one embodiment of the invention, an endless belt spur conveyor assembly includes a frame having an elongated main portion and a short laterally projecting side portion. A set of end rollers are supported by the frame portions for rotation on corresponding axes which form a right angle therebetween. An endless belt of rubber-like material is directed around the end rollers, and the end roller on other side frame portion is driven by a variable speed motor and gear reducer unit. A pair of vertically spaced cylindrical belt guide members or tubes extend within the belt from one side of the main frame portion to one side of the side frame portion, and the endless belt is directed around and between the stationary tubes to the driven end roller.

The vertically spaced parallel belt guide tubes have corresponding opposite end portions which are closed by end plates forming a right angle therebetween. The end plates are rigidly secured to the frame, and pressurized air is supplied to the belt guide tubes. The belt wraps about 180 degrees around each guide tube, and spaced holes and longitudinally extending flats are formed in the high pressure zone of each guide tube for producing a film of air between each tube and the endless belt. As a result, the conveyor system may be operated at a substantially higher speed without significant belt wear.

Other features and advantages of the invention will be apparent from the following description, the accompanying drawings and the appended claims.

BRIEF DESCRIPTION OF THE DRAWINGS

FIG. 1 is a perspective view of an endless belt spur conveyor constructed in accordance with the invention;

FIG. 2 is a plan view of the conveyor shown in FIG. 1;

FIG. 3 is a section taken generally on the line 3—3 of FIG. 2;

FIG. 4 is a top view of one of the stationary belt guide tubes;

FIG. 5 is an elevational view of the guide tube taken generally on the line 5—5 of FIG. 4 and with the end portions broken away; and FIG. 6 is a fragmentary section taken generally on the line 6—6 of FIG. 2.

DESCRIPTION OF THE PREFERRED EMBODIMENT

FIGS. 1–3 illustrate a spur conveyor assembly 15 including an L-shaped frame 18 having parallel spaced side rails 19 and 21 rigidly connected by a set of cross frame members 23 (FIG. 3). The side rails 19 and 21 are supported by a set of vertical legs 24 which are rigidly connected by cross frame tubes or members 26 and 27 and an end angle member 29. The frame 18 also includes a U-shaped frame portion 32 which projects laterally from the side rail 21 and is rigidly secured to the side rail 19 by the angle member 29 (FIG. 1).

An endless flexible belt 35 of reinforced rubber-like material extends between the side rails 19 and 21 of the frame 18 and has an upper run supported by a flat platform or plate 38 having side flanges 39 secured to the side rails by a series of bolts 41 (FIG. 3). An L-shaped platform or plate 42 forms an extension of the plate 38 and is also secured to the frame portion 32. The belt 35 extends around an end roller 44 (FIG. 3) supported for rotation between the side rails 19 and 21, and the lower run of the belt 35 extends downwardly between a pair of guide rollers 47 and around an adjustable tension roller 48. The roller 48 has a support shaft with opposite end portions 51 which project through corresponding vertical slots 52 within the side rails. An adjustable downward force is exerted on the end portions 51 of the tension roller 48 by a set of compression springs 54 mounted on vertical guide bolts extending through holes within the shaft end portions 51 and secured to the side rails.

As shown in FIGS. 1 and 3, the upper and lower runs of the endless belt 35 extend or wrap around a pair of vertically spaced and parallel guide members or tubes 55 which are rigidly supported by the frame 18 and extend transversely across the belt 35 at an angle of 45 degrees with respect to the path of the belt between the side rails. As shown in FIG. 2, the belt guide members or tubes 55 are effective to change the direction or path of the belt 35 by an angle of 90 degrees. The belt 35 extends between the guide tubes 55 and around an end roller 58 having a shaft 59 supported by bearings 61 mounted on the frame portion 32. The roller 58 has an outer surface with a slight crown, and the inner bearing 61 is adjustable by a screw 62 to provide for proper tracking of the belt 35 on the desired path. As apparent from FIG. 2, the axis of the end roller 58 forms a right angle with the axis of the opposite end roller 44.

The roller 58 is driven by a drive unit 65 which includes a gear reducer 67 having an output shaft connected to the shaft 59 by a coupling 69. The input shaft of the gear reducer 67 is driven by a variable speed reversible motor 72 (FIG. 3) through a belt drive enclosed within a housing 74. The drive unit 65 is supported by the frame 18 with the motor located under the gear reducer 67, as shown in FIG. 3.

Referring to FIG. 4, each of the cylindrical belt guide members or tubes 55 is closed at opposite ends by a set of closure plates 82 which extend at angles of 45 degrees with respect to the axis of the tube and are welded to the ends of the tubes. As shown in FIGS. 1 and 2, the end plates 82 are secured by bolts 84 to the side rail 19 and to the laterally projecting frame portion 32 and form a rigid connection between these frame portions. A supply of pressurized air is directed to the belt guide tubes 55 through an adjustable pressure regulator 86 (FIG. 1), air lines 8 and fittings 91 in order to pressurize each of the tubes 55 with a predetermined air pressure, for example, on the order of 40 p.s.i.

As shown in FIGS. 4–6, each of the belt guide tubes 55 has a set of three circumferentially spaced air discharge holes or ports 94 having a diameter of about 1/16 inch for releasing air from each tube. One of the holes or ports 94 is located at the center of the peripheral or circumferential wrap of the belt 35 around the tube 55, and the other two ports 94 are located above and below the center port by an angle A of 22.5 degrees. Each tube 55 is also provided with three circumferentially spaced and longitudinally extending flats 96 on its outer surface. The angular spacing of the flats 96 is the same as that for the center ports 94 so that the flats are aligned with the center holes or ports. In addition to the center holes or ports 94, each tube is provided with two holes or ports 98 located at the opposite ends of the center flat 96. Each port 98 is located approximately 2 inches inwardly from the corresponding edge of the belt 35.

In operation of the spur conveyor assembly 15, the endless belt 35 may be driven in either direction depending upon the operation of the reversible motor 72. When pressurized air, for example, at a pressure of 40 p.s.i., is supplied to the belt guide tubes 55, the air flows slowly through the holes or ports 94 and 98 and axially down the flats 96 to form a film of air between the belt 35 and each of the belt guide tubes 55 over the entire area of the tube 55 covered by the belt 35. As a result, the belt 35 is free to move circumferentially and axially around the guide tubes 55 with substantially no friction and without producing any significant friction heat.

From the drawings and the above description, it is apparent that a conveyor system constructed in accordance with the present invention, provides desirable features and advantages. For example, as a result of the transverse belt guide tubes 55 which create an air film within the high pressure zone of the belt wrap around each tube, the belt 35 may be driven at a relatively high speed, for example, over 350 feet per minute, without producing significant friction heat when the belt changes direction around the guide tubes 55. In addition, the air film between the belt and each of the guide tubes 55 is effective to cool the belt as the belt moves circumferentially and axially around each guide tube.

As mentioned above, the belt 35 may be driven in either direction simply by reversing the motor 72 so that the spur conveyor may be used for feeding packages or articles onto a main conveyor or for removing the articles from a main conveyor equipped with a sorting mechanism. While the belt guide tubes 55 are illustrated in the drawings at an angle of 45 degrees relative to the main run of the conveyor belt 35 and the side rails 19 and 21, it is apparent that the guide tubes may be positioned at a different acute angle according to how the spur conveyor is used.

It has also been found that the location of the air discharge holes 94 and 98 within each belts guide tube 55 and the longitudinally extending flats 96 provide for generating a continuous film of air between the belt and each guide tube while minimizing the flow rate of air. Preferably, the tension in the belt 35 is selected by adjusting the tension roller 48 until the tension load in the belt is approximately 120 pounds per inch of belt width. With this significant belt tension, it has been determined that an air pressure of about 40 p.s.i. in each guide tube 55 is effective to produce the desired air film between the guide tube and the wrapping portion of the belt since the holes 94 and 98 are located within the area of the tube where the belt exerts the greatest pressure on the tube. It is also apparent from FIGS. 1 and 2 that the belt guide tubes 55 form a rigid connection between the side rail 19 of the frame 18 and the projecting U-shaped portion 32 of the frame and that the tubes 55 may be located very close to a main conveyor.

While the form of conveyor assembly herein described constitutes a preferred embodiment of the invention, it is to be understood that the invention is not limited to this precise form, and that changes may be made therein without departing from the scope and spirit of the invention as defined in the appended claims.

The invention having thus been described, the following is claimed:

1. A spur conveyor assembly for transporting packages and other articles and adapted to extend at an angle from a main package transporting conveyor, said assembly comprising a frame, an endless flexible belt of rubber-like material and having upper and lower runs, a set of belt guide rollers supported by said frame for rotation and positioned for directing said belt along a predetermined path, means mounted on said frame for supporting said upper run of said belt and the articles carried by said belt, means for driving one of said rollers to move said belt along said supporting means, a set of vertically spaced and non-rotatable elongated air distributing members extending within said belt, means for supplying pressurized air to each of said air distributing members, each of said air distributing members having opposite end portions and a curved outer surface with a longitudinally extending recess, means for securing said opposite end portions of said air distributing members to said frame for positively positioning said members at an acute angle relative to said belt path for changing the direction of travel of said belt, said belt extending around said air distributing members and horizontally between said members, and means for directing the air between each said air distributing member and said belt and longitudinally within said recess to produce a film of air between each said member and said belt to provide for axial and peripheral movement of said belt relative to each said member to permit high speed operation of said spur conveyor assembly without overheating said belt.

2. A spur conveyor as defined in claim 1 wherein each said air distributing member comprises a tube having closed opposite said end portions, said air supplying means is connected to said tubes, and said air directing means comprise space holes within each said tube.

3. A spur conveyor assembly as defined in claim 2 wherein said belt extends peripheral about 180 degrees around each said tube, and said air directing means comprise axially spaced holes within a peripheral center portion of said tube relative to the peripheral portion of said tube covered by said belt.

4. A spur conveyor assembly as defined in claim 1 wherein said frame comprises an elongated main portion and a side portion projecting laterally from said main portion, said guide rollers supported by said main frame and said side frame portions with corresponding axes forming an angle of about 90 degrees therebetween, and said air distributing members rigidly connect said main and side portions of said frame.

5. A conveyor assembly as defined in claim 4 wherein said means for driving said belt comprise a motor and gear reducer unit connected to drive said guide roller supported by said side portion of said frame.

6. A spur conveyor as defined in claim 2 wherein said spaced holes are spaced axially within a peripheral center portion of each said tube relative to the peripheral portion of said tube covered by said belt.

7. A spur conveyor as defined in claim 2 wherein said opposite end portions of each tube are closed by a set of end plates, said end plates form an angle of about 90 degrees therebetween, and means for rigidly securing said end plates to said frame.

8. A spur conveyor as defined in claim 1 wherein said vertically spaced air distributing members comprise generally cylindrical parallel spaced tubes having opposite said end portions, closure means for closing opposite said end portions of said tubes, means for rigidly connecting said closure means to said frame, and said belt extends about 180 degrees around each said tube.

9. A spur conveyor assembly for transporting packages and other articles and adapted to extend at an angle from a main package transporting conveyor, said assembly comprising a frame including a main portion and a side portion projecting laterally from said main portion, an endless flexible belt of rubber-like material and having upper and lower runs, a set of belt guide rollers supported for rotation by said main portion and said side portion of said frame and positioned for directing said belt along a predetermined path, means mounted on said frame for supporting said upper run of said belt and the articles carried by said belt, means for driving one of said rollers to move said belt along said supporting means, a set of vertically spaced and non-rotatable elongated air distributing tubes extending within said belt, means for supplying pressurized air to each of said air distributing tubes, each of said air distributing tubes having opposite end portions and a curved outer surface with a longitudinally extending recess, means for closing and securing said opposite end portions of said air distributing tubes to said frame for positively positioning said tubes at an acute angle relative to said belt path for changing the direction of travel of said belt, said belt extending around said air distributing tubes and horizontally between said tubes and around said one of said rollers, and means for directing the air outwardly through holes within said air distributing tubes and longitudinally within each said recess against said belt to produce a film of air between each said tube and said belt to provide for axial and peripheral movement of said belt relative to each said tube to permit high speed operation of said spur conveyor assembly without overheating said belt.

10. A spur conveyor as defined in claim 9 wherein said spaced holes are located within a peripheral center portion of each said tube relative to the peripheral portion of said tube covered by said belt.

11. A spur conveyor as defined in claim 9 wherein said opposite end portions of each tube are closed by a set of end plates, said end plates form an angle of about 90 degrees therebetween, and means for rigidly securing said end plates to said frame.

12. A spur conveyor as defined in claim 9 wherein said belt guide rollers comprise a set of end rollers having corresponding axes forming an angle of about 90 degrees therebetween, and said air distributing tubes have corresponding axes forming an acute angle with said axis of each of said roller.

* * * * *